US011645797B1

(12) United States Patent
Kovacs

(10) Patent No.: US 11,645,797 B1
(45) Date of Patent: May 9, 2023

(54) MOTION CONTROL FOR AN OBJECT

(71) Applicant: Apple Inc., Cupertino, CA (US)

(72) Inventor: Daniel Laszlo Kovacs, Santa Clara, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 16/998,257

(22) Filed: Aug. 20, 2020

Related U.S. Application Data

(60) Provisional application No. 62/906,663, filed on Sep. 26, 2019.

(51) Int. Cl.
*G06T 13/00* (2011.01)
*G06N 3/08* (2006.01)
*G06N 3/04* (2023.01)

(52) U.S. Cl.
CPC .............. *G06T 13/00* (2013.01); *G06N 3/04* (2013.01); *G06N 3/08* (2013.01)

(58) Field of Classification Search
CPC ............ G06T 13/00; G06T 13/20; G06N 3/08
See application file for complete search history.

(56) References Cited

U.S. PATENT DOCUMENTS

2015/0193945 A1* 7/2015 Baek ................ G06T 13/40
345/474
2019/0035129 A1* 1/2019 Hutchinson .......... H04N 19/463
2019/0114546 A1* 4/2019 Anil ........................ G06N 3/04
2019/0381404 A1* 12/2019 Buttner .................. G06T 13/00

OTHER PUBLICATIONS

Daniel Holden et al., "Phase-Functional Neural Networks for Character Control", ACM Transactions on Graphics, vol. 36, No. 4, Article 42, Jul. 2017, pp. 1-13.

* cited by examiner

*Primary Examiner* — Yi Yang
(74) *Attorney, Agent, or Firm* — Fernando & Partners, LLP

(57) ABSTRACT

Various implementations disclosed herein include devices, systems, and methods for controlling motion of CGR objects. In various implementations, a device includes a non-transitory memory and one or more processors coupled with the non-transitory memory. In some implementations, a method includes determining, by a first animation controller, values for a first set of animation parameters associated with a first animation for a computer-generated reality (CGR) object. In some implementations, the CGR object is associated with a plurality of joints. In some implementations, the method includes generating, by a motion controller, respective joint movements for the plurality of joints based on the values for the first set of animation parameters. In some implementations, the method includes manipulating the CGR object in accordance with the respective joint movements for the plurality of joints in order to provide an appearance that CGR object is moving within a degree of similarity to the first animation.

19 Claims, 8 Drawing Sheets

400

Determine, by a first animation controller, values for a firs set of animation parameters associated with a first animation for a CGR object, the CGR object is associated with a plurality of joints ⟶ 402

Generate, by a motion controller, respective joint movements for the plurality of joints based on the values for the first set of animation parameters ⟶ 404

Manipulate the CGR object in accordance with the respective joint movements for the plurality of joints in order to provide an appearance that the CGR object is moving within a degree of similarity to the first animation ⟶ 406

Figure 4A

- Obtain, from a second animation controller, a second set of animation parameters associated with a second animation
- Generate joint movements based on the second set of animation parameters
- Manipulate the CGR object in accordance with the second set of animation parameters in order to provide an appearance that the CGR object is moving with a degree of similarity to the second animation — 424

Train the motion controller with training data that includes values for the second set of animation parameters and corresponding joint movements — 426

- Determine that the CGR object is to perform an action in a CGR environment
- Determine that the action is within a degree of similarity to the first animation
- Select the first animation controller from a plurality of animation controllers — 428

- Query the first animation controller for the values for the first set of animation parameters
- Receive the values for the first set of animation parameters from the first animation controller — 430

Figure 4C

MOTION CONTROL FOR AN OBJECT

CROSS-REFERENCE TO RELATED APPLICATION

This application claims the benefit of U.S. Provisional Patent App. No. 62/906,663, filed on Sep. 26, 2019, which is incorporated by reference in its entirety.

TECHNICAL FIELD

The present disclosure generally relates to motion control for an object.

BACKGROUND

Some devices are capable of generating and presenting computer-generated reality (CGR) environments. Some CGR environments include virtual environments that are simulated replacements of physical environments. Some CGR environments include augmented environments that are modified versions of physical environments. Some devices that present CGR environments include mobile communication devices such as smartphones, head-mountable displays (HMDs), eyeglasses, heads-up displays (HUDs), and optical projection systems. Most previously available devices that present CGR environments are ineffective at presenting representations of certain objects. For example, some previously available devices that present CGR environments are unsuitable for presenting representations of objects that are associated with an action.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 4A-4C are flowchart representations of a method of controlling motion of a CGR object in accordance with some implementations.

Figure 1:
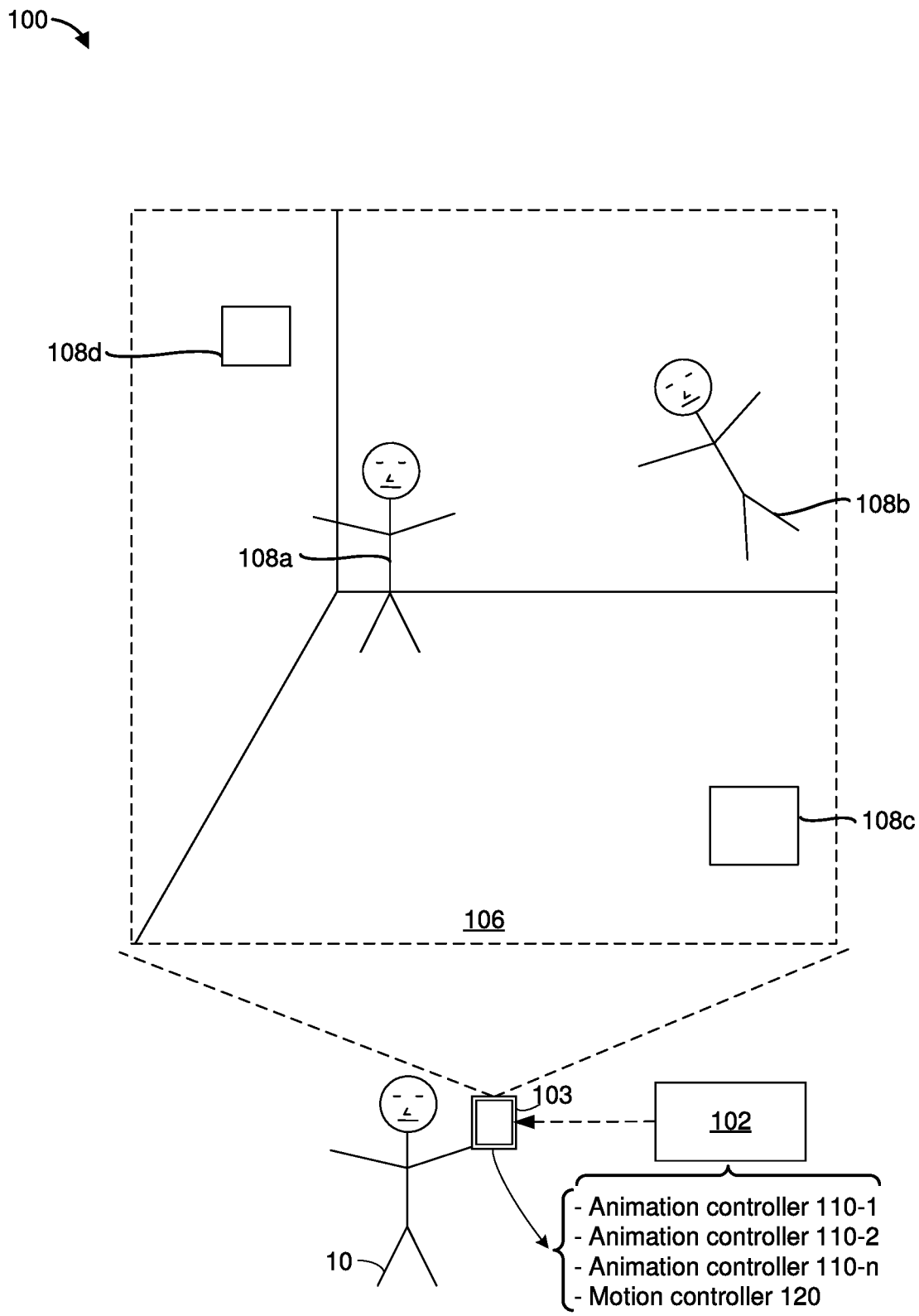
FIG. 1 is a diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for controlling motion of a CGR object. In various implementations, a device includes a non-transitory memory and one or more processors coupled with the non-transitory memory. In some implementations, a method includes determining, by a first animation controller, values for a first set of animation parameters associated with a first animation for a computer-generated reality (CGR) object. In some implementations, the CGR object is associated with a plurality of joints. In some implementations, the method includes generating, by a motion controller, respective joint movements for the plurality of joints based on the values for the first set of animation parameters. In some implementations, the method includes manipulating the CGR object in accordance with the respective joint movements for the plurality of joints in order to provide an appearance that CGR object is moving within a degree of similarity to the first animation.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In various implementations, a device directs a CGR representation of an agent to perform one or more actions in order to effectuate (e.g., advance, satisfy, complete and/or achieve) one or more objectives (e.g., results and/or goals). In some implementations, the agent is associated with a particular objective, and the CGR representation of the agent performs actions that improve the likelihood of effectuating that particular objective. In some implementations, the CGR representation of the agent corresponds to a CGR affordance. In some implementations, the CGR representation of the agent is referred to as a CGR object. In some implementations, the agent is referred to as a virtual intelligent agent (VIA) or an intelligent agent.

In some implementations, a CGR representation of the agent performs a sequence of actions. In some implementations, a device determines (e.g., generates and/or synthesizes) the actions for the agent. In some implementations, the actions generated for the agent are within a degree of similarity to actions that a corresponding entity (e.g., a character, an equipment and/or a thing) performs as described in fictional material or as exists in a physical environment. For example, in some implementations, a CGR representation of an agent that models the behavior of a fictional action figure performs the action of flying in a CGR environment because the corresponding fictional action figure flies as described in the fictional material. Similarly, in some implementations, a CGR representation of an agent that models the behavior of a physical drone performs the action of hovering in a CGR environment because the corresponding physical drone hovers in a physical environment. In some implementations, the device obtains the actions for the agent. For example, in some implementations, the device receives the actions for the agent from a separate device (e.g., a remote server) that determines the actions.

In some implementations, an agent that models the behavior of a character is referred to as a character agent, an objective of the character agent is referred to as a character objective, and a CGR representation of the character agent is referred to as a CGR character or a virtual character. In some implementations, the CGR character performs actions in order to effectuate the character objective.

In some implementations, an agent that models the behavior of an equipment (e.g., a rope for climbing, an airplane for flying, a pair of scissors for cutting) is referred to as an equipment agent, an objective of the equipment agent is referred to as an equipment objective, and a CGR representation of the equipment agent is referred to as a CGR equipment or a virtual equipment. In some implementations, the CGR equipment performs actions in order to effectuate the equipment objective.

In some implementations, an agent that models the behavior of an environment (e.g., weather pattern, features of nature and/or gravity level) is referred to as an environmental agent, and an objective of the environmental agent is referred to as an environmental objective. In some implementations, the environmental agent configures an environment of the CGR environment in order to effectuate the environmental objective.

A motion controller controls various joints of a CGR representation of an agent. Traditionally, motion controllers have provided motion for specific animations. As such, each animation typically requires a dedicated motion controller that generates motion for that particular animation. For example, a running animation may require a running motion controller that generates motion data for the running animation. Similarly, a jumping animation may require a jumping motion controller that generates motion data for the jumping animation. Generating a motion controller for each animation is resource intensive. Since generating motion controllers is resource intensive, the number of available motion controllers is limited. As such, the range of animations that a CGR representation of an agent can undergo is also limited.

The present disclosure provides methods, systems, and/or devices in which motion control is separated from animation control. Separating motion control from animation control allows a motion controller to provide motion data for multiple animations. As such, a motion controller can serve as the basis for enabling multiple animations instead of a single built-in animation. Animation controllers for different animations provide animation parameter values to the motion controller, and the motion controller generates joint movements for each animation when needed. For example, an animation controller for running provides the motion controller with a running speed, and the motion controller generates the joint movements to effectuate the running animation. Similarly, an animation controller for jumping provides the motion controller with a jump height and a horizontal jump distance, and the same motion controller generates the joint movements to effectuator the jumping animation. Separating motion control from animation control reduces the need to generate a dedicated motion controller for each animation. Since a dedicated motion controller is no longer needed for each animation, introducing new animations is less resource intensive. For example, the computing resources and time needed to train multiple motion controllers is conserved. Separating motion control from animation control also enables the mixed use of machine-learned animations and human-curated animations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 102 and an electronic device 103. In the example of FIG. 1, the electronic device 103 is being held by a user 10. In some implementations, the electronic device 103 includes a smartphone, a tablet, a laptop, or the like.

As illustrated in FIG. 1, the electronic device 103 presents a computer-generated reality (CGR) environment 106. In some implementations, the CGR environment 106 is generated by the controller 102 and/or the electronic device 103. In some implementations, the CGR environment 106 includes a virtual environment that is a simulated replacement of a physical environment. In other words, in some implementations, the CGR environment 106 is synthesized by the controller 102 and/or the electronic device 103. In such implementations, the CGR environment 106 is different from a physical environment where the electronic device 103 is located. In some implementations, the CGR environment 106 includes an augmented environment that is a modified version of a physical environment. For example, in some implementations, the controller 102 and/or the electronic device 103 modify (e.g., augment) the physical environment where the electronic device 103 is located in order to generate the CGR environment 106. In some implementations, the controller 102 and/or the electronic device 103 generate the CGR environment 106 by simulating a replica of the physical environment where the electronic device 103 is located. In some implementations, the controller 102 and/or the electronic device 103 generate the CGR environment 106 by removing and/or adding items from the simulated replica of the physical environment where the electronic device 103 is located.

In some implementations, the CGR environment 106 includes various CGR representations of agents, such as a boy action figure representation 108a, a girl action figure representation 108b, a robot representation 108c, and a drone representation 108d. In some implementations, the agents represent and model the behavior of characters from fictional materials, such as movies, video games, comics, and novels. For example, the boy action figure representation 108a represents and models the behavior of a 'boy action figure' character from a fictional comic, and the girl action figure representation 108b represents and models the behavior of a 'girl action figure' character from a fictional video game. In some implementations, the CGR environment 106 includes agents that represent and model the behavior of characters from different fictional materials (e.g., from different movies, games, comics or novels). In various implementations, the agents represent and model the behavior of physical entities (e.g., tangible objects). For example, in some implementations, the agents represent and the model the behavior of equipment (e.g., machinery such as planes, tanks, robots, cars, etc.). In the example of FIG. 1, the robot representation 108c represents and models the behavior of a robot, and the drone representation 108d represents and models the behavior of a drone. In some implementations, the agents represent and model the behavior of entities (e.g., characters or equipment) from fictional materials. In some implementations, the agents represent and model the behavior of entities from a physical environment, including entities located inside and/or outside of the CGR environment 106.

In various implementations, a CGR representation of an agent performs one or more actions in order to effectuate (e.g., advance, complete, satisfy and/or achieve) one or more objectives of the agent. In some implementations, the CGR representation of the agent performs a sequence of actions. In some implementations, the controller 102 and/or the electronic device 103 determine the actions that the CGR representation of an agent performs. In some implementations, the actions of a CGR representation of an agent are within a degree of similarity to actions that the corresponding entity (e.g., character, equipment or thing) performs in the fictional material. In the example of FIG. 1, the girl action figure representation 108b is performing the action of flying (e.g., because the corresponding 'girl action figure' character is capable of flying, and/or the 'girl action figure' character frequently flies in the fictional materials). In the example of FIG. 1, the drone representation 108d is performing the action of hovering (e.g., because drones in physical environments are capable of hovering). In some implementations, the controller 102 and/or the electronic device 103 obtain the actions for the agents. For example, in some implementations, the controller 102 and/or the electronic device 103 receive the actions for the agents from a remote server that determines (e.g., selects) the actions. In some implementations, a CGR representation of an agent is referred to as a CGR object, a virtual object or a graphical object.

In some implementations, the CGR environment 106 is generated based on a user input from the user 10. For example, in some implementations, the electronic device 103 receives a user input indicating a terrain for the CGR environment 106. In such implementations, the controller 102 and/or the electronic device 103 configure the CGR environment 106 such that the CGR environment 106 includes the terrain indicated via the user input. In some implementations, the user input indicates environmental conditions for the CGR environment 106. In such implementations, the controller 102 and/or the electronic device 103 configure the CGR environment 106 to have the environmental conditions indicated by the user input. In some implementations, the environmental conditions include one or more of temperature, humidity, pressure, visibility, ambient light level, ambient sound level, time of day (e.g., morning, afternoon, evening, or night), and precipitation (e.g., overcast, rain, or snow). In some implementations, the user input specifies a time period for the CGR environment 106. In such implementations, the controller 102 and/or the electronic device 103 maintain and present the CGR environment 106 during the specified time period.

In some implementations, the controller 102 and/or the electronic device 103 determine (e.g., generate) actions for the agents based on a user input from the user 10. For example, in some implementations, the electronic device 103 receives a user input indicating placement of the CGR representations of the agents. In such implementations, the controller 102 and/or the electronic device 103 position the CGR representations of the agents in accordance with the placement indicated by the user input. In some implementations, the user input indicates specific actions that the agents are permitted to perform. In such implementations, the controller 102 and/or the electronic device 103 select the actions for the agents from the specific actions indicated by the user input. In some implementations, the controller 102 and/or the electronic device 103 forgo actions that are not among the specific actions indicated by the user input.

In some implementations, the controller 102 and/or the electronic device 103 include various animation controllers 110-1, 110-2, . . . , and 110-n that provide respective animations for CGR objects in the CGR environment 106. For example, in some implementations, the animation controller 110-1 provides a running animation for the boy action figure representation 108a and/or the girl action figure representation 108b. In some implementations, the animation controller 110-2 provides a flying animation for the girl action figure representation 108b. In some implementations, the animation controller 110-n provides a hovering animation for the drone representation 108d. In some implementations, the animation controllers 110-1, 110-2, . . . , and 110-n provide cyclic animations for actions that occur in cycles and/or tend to be repetitive (e.g., running, jumping, etc.). In some implementations, the animation controllers 110-1, 110-2, . . . , and 110-n provide acyclic animations or non-cyclic animations for actions that tend not be cyclic.

In various implementations, each of the animation controllers 110-1, 110-2, . . . , and 110-n is associated with respective animation parameters. For example, in some implementations, the animation controller 110-1 for the running animation is associated with a running speed parameter and/or a running style parameter. In some implementations, the animation controller 110-2 for the flying animation is associated with a flying speed parameter and/or a flying height parameter. In some implementations, the animation controllers 110-1, 110-2, . . . , and 110-n determine values for the respective animation parameters. For example, the animation controller 110-1 for the running animation determines a value for the running speed parameter and/or a value for the running style parameter. Similarly, in some implementations, the animation controller 110-2 for the flying animation determines a value for the flying speed parameter and/or a value for the flying height parameter.

In some implementations, the controller 102 and/or the electronic device 103 include a motion controller 120 that generates motion data for each of the animations provided by the animation controllers 110-1, 110-2, . . . , and 110-n. In various implementations, the motion controller 120 determines joint movements for various joints of the boy action figure representation 108a and/or the girl action figure representation 108b in order to provide an appearance that the boy action figure representation 108a and/or the girl action figure representation 108b are performing one of the animations provided by the animation controllers 110-1, 110-2, . . . , and 110-n. In some implementations, the motion controller 120 determines the joint movements based on the values for the animation parameters generated by the animation controllers 110-1, 110-2, . . . , and 110-n. As such, the joint movements determined by the motion controller 120 are a function of the values for the animation parameters generated by the animation controllers 110-1, 110-2, . . . , and 110-n. In various implementations, the motion controller 120 determines the joint movements by generating joint movement values (e.g., joint position values and/or joint angle values).

As can be seen in FIG. 1, a single motion controller 120 generates joint movements for the various animations provided by the animation controllers 110-1, 110-2, . . . , and 110-n. Since the motion controller 120 generates joint movements for multiple animations, the motion controller 120 reduces the need for dedicated motion controllers for each of the animation controllers 110-1, 110-2, . . . , and 110-n. Since the motion controller 120 reduces the need to generate dedicated motion controllers for each animation, introducing new animations is less resource intensive. For example, the motion controller 120 reduces the need to utilize computing resources and/or time to train multiple motion controllers. The motion controller 120 also enables the mixed use of machine-learned animations and human-curated animations.

In various implementations, an animation defines a sequence of poses that collectively span a time duration. When a CGR object adopts the various poses defined by an animation in a sequential manner, the CGR object provides an appearance that the CGR object is performing an action that is associated with the animation. For example, when the boy action figure representation 108a sequentially adopts poses defined by a walking animation, the boy action figure representation 108a provides an appearance that the boy action figure representation 108a is walking.

In some implementations, a head-mountable device (HMD) replaces the electronic device 103. In some implementations, the HMD is worn by the user 10. In some implementations, the HMD presents (e.g., displays) the CGR environment 106 according to various implementations. In some implementations, the HMD includes an integrated display (e.g., a built-in display) that displays the CGR environment 106. In some implementations, the HMD includes a head-mountable enclosure. In various implementations, the head-mountable enclosure includes an attachment region to which another device with a display can be attached. For example, in some implementations, the electronic device 103 can be attached to the head-mountable enclosure. In various implementations, the head-mountable enclosure is shaped to form a receptacle for receiving another device that includes a display (e.g., the electronic device 103). For example, in some implementations, the electronic device 103 slides/snaps into or otherwise attaches to the head-mountable enclosure. In some implementations, the display of the device attached to the head-mountable enclosure presents (e.g., displays) the CGR environment 106. In various implementations, examples of the electronic device 103 include smartphones, tablets, media players, laptops, etc. In some implementations, the controller 102 and/or the HMD implement the animation controllers 110-1, 110-2, . . . , and 110-n, and/or the motion controller 120.

Figure 2A:
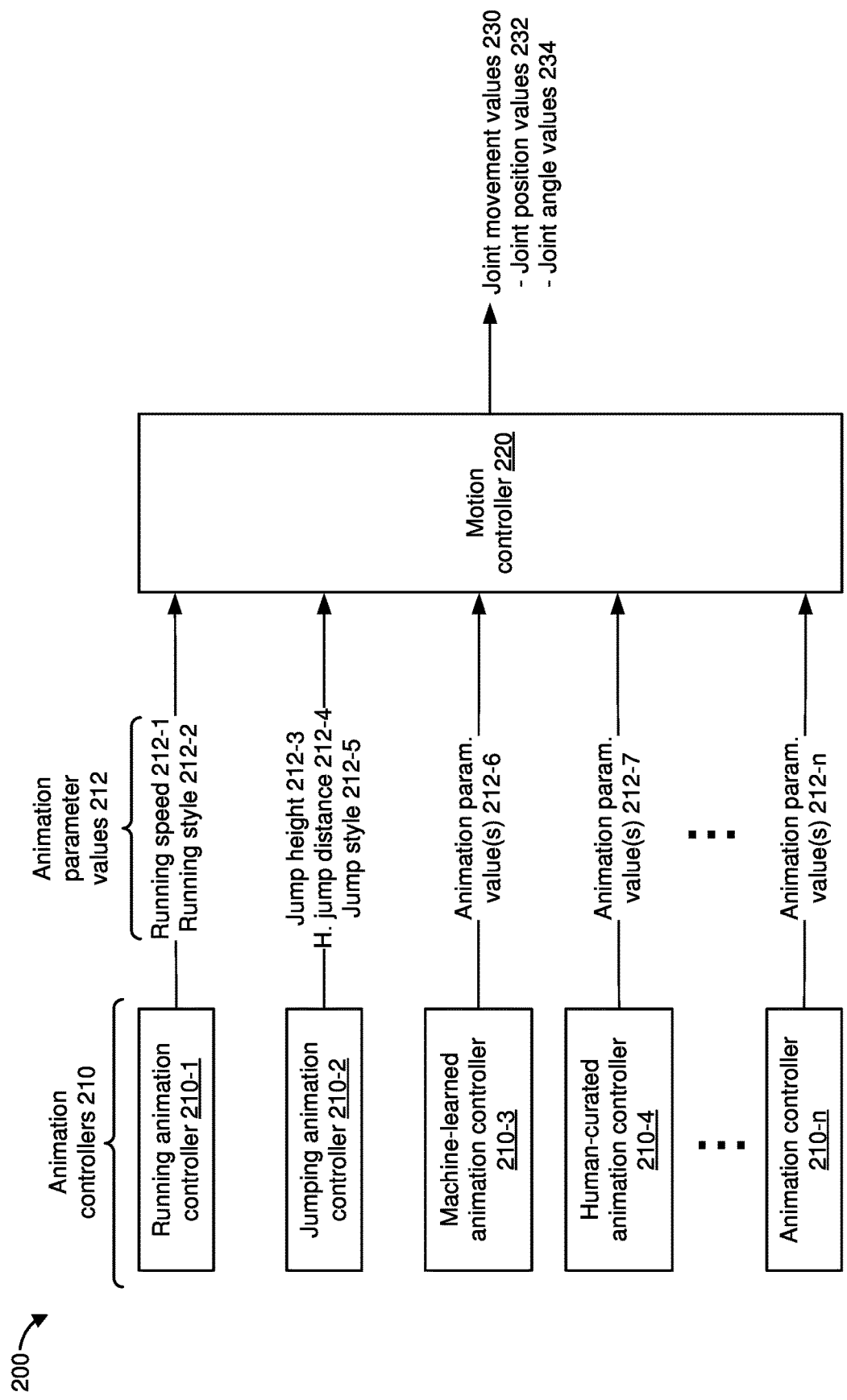
FIG. 2A is a block diagram of an example system for controlling motion of a CGR object in accordance with some implementations.

FIG. 2A is a block diagram of an example system 200 for controlling motion of a CGR object (e.g., a CGR representation of an agent, for example, the boy action figure representation 108a, the girl action figure representation 108b, the robot representation 108c and/or the drone representation 108d shown in FIG. 1). In some implementations, the system 200 resides at the controller 102 and/or the electronic device 103 shown in FIG. 1. In various implementations, the system 200 includes animation controllers 210 and a motion controller 220. In some implementations, the animation controllers 210 and the motion controller 220 implement the animation controllers 110-1, 110-2, . . . , and 110-n and the motion controller 110, respectively, shown in FIG. 1.

In the example of FIG. 2A, the animation controllers 210 include a running animation controller 210-1 that provides a running animation. In some implementations, the animation controllers 210 include a jumping animation controller 210-2 that provides a jumping animation. In some implementations, the animation controllers 210 include a machine-learned animation controller 210-3 that provides a machine-learned animation. In some implementations, a machine-learned animation refers to an animation that is generated by identifying and mimicking a cyclic movement in source material (e.g., a movie, a television show, a book, etc.). In some implementations, the animation controllers 210 include a human-curated animation controller 210-4 that provides a human-curated animation. In some implementations, a human-curated animation refers to an animation that is specified by a human (e.g., the user 10 shown in FIG. 1). In some implementations, the animation controllers 210 include an nth animation controller 210n that provides an nth animation.

In various implementations, the animation controllers 210 determine (e.g., compute) animation parameter values 212 for respective animation parameters associated with the animation controllers 210. For example, in some implementations, the running animation controller 210-1 determines a running speed 212-1 and/or a running style 212-2 for the running animation. In some implementations, the jumping animation controller 212-2 determines a jump height 212-3, a horizontal jump distance 212-4 and/or a jump style 212-5 for the jumping animation. In some implementations, the machine-learned animation controller 210-3 determines one or more animation parameters values 212-6 for the machine-learned animation. In some implementations, the human-curated animation controller 210-4 determines one or more animation parameter values 212-7 for the human-curated animation. In some implementations, the nth animation controller 210-n determines one or more nth parameter values 212-n for the nth animation.

In some implementations, the animation controllers 210 state the animation parameter values 212 in physical units. For example, in some implementations, the running animation controller 210-1 states the running speed 212-2 as a physical distance over a unit of time (e.g., in miles per hour (mph) or in kilometers per hour (kmph)). In some implementations, the jumping animation controller 210-2 states the jump height 212-3 and/or the horizontal jump distance 212-4 as a physical distance (e.g., in meters (m) or in feet (ft)).

In some implementations, the animation controllers 210 state the animation parameter values 212 in virtual units. For example, in some implementations, the running animation controller 210-1 states the running speed 212-2 as a virtual distance over a unit of time (e.g., in number of pixels per millisecond). In some implementations, the jumping animation controller 210-2 states the jump height 212-3 and/or the horizontal jump distance 212-4 as a virtual distance (e.g., in pixels).

In various implementations, the motion controller 220 generates joint movement values 230 for various joints of CGR objects based on the animation parameter values 212. In some implementations, the joint movement values 230 define movement of various joints of a CGR object in order to provide an appearance that the CGR object is performing an animated movement in accordance with the animation parameter values 212. For example, in some implementations, the joint movement values 230 define movement of various joints of the boy action figure representation 108a shown in FIG. 1 in order to provide an appearance that the boy action figure representation 108a is running at the running speed 212-1. Similarly, in some implementations, the joint movement values 230 define movement of various joints of a CGR object representing a character agent in order to provide an appearance that the CGR object is jumping to a jump height 212-3 and across a horizontal jump distance 212-4 in accordance with the jump style 212-5.

In some implementations, the joint movement values 230 include joint position values 232. In some implementations, the joint position values 232 include sets of position coordinates (e.g., x, y, z) for respective joints. For example, in some implementations, the joint position values 232 include sets of position coordinates $(x_1, y_1, z_1)$, $(x_2, y_2, z_2)$, $(x_3, y_3, z_3)$, $(x_4, y_4, z_4)$, $(x_5, y_5, z_5)$, $(x_6, y_6, z_6)$, $(x_7, y_7, z_7)$, $(x_8, y_8, z_8)$, $(x_9, y_9, z_9)$, $(x_{10}, y_{10}, z_{10})$, $(x_{11}, y_{11}, z_{11})$ and $(x_{12}, y_{12}, z_{12})$ for a right shoulder joint, a left shoulder joint, a right elbow joint, a left elbow joint, a right wrist joint, a left wrist joint, a right hip joint, a left hip joint, a right knee joint, a left knee joint, a right ankle joint and a left ankle joint, respectively.

In some implementations, the joint movement values 230 include joint angle values 234. In some implementations, the joint angle values 234 include sets of angular coordinates (e.g., $\alpha$, $\beta$ and $\gamma$) for respective joints. For example, in some implementations, the joint angle values 234 include sets of angular coordinates $(\alpha_1, \beta_1, \gamma_1)$, $(\alpha_2, \beta_2, \gamma_2)$, $(\alpha_3, \beta_3, \gamma_3)$, $(\alpha_4, \beta_4, \gamma_4)$, $(\alpha_5, \beta_5, \gamma_5)$, $(\alpha_6, \beta_6, \gamma_6)$, $(\alpha_7, \beta_7, \gamma_7)$, $(\alpha_8, \beta_8, \gamma_8)$, $(\alpha_9, \beta_9, \gamma_9)$, $(\alpha_{10}, \beta_{10}, \gamma_{10})$, $(\alpha_{11}, \beta_{11}, \gamma_{11})$ and $(\alpha_{12}, \beta_{12}, \gamma_{12})$ for the right shoulder joint, the left shoulder joint, the right elbow joint, the left elbow joint, the right wrist joint, the left wrist joint, the right hip joint, the left hip joint, the right knee joint, the left knee joint, the right ankle joint and the left ankle joint, respectively.

In some implementations, the motion controller 220 states the joint movement values 230 (e.g., the position/angular coordinates) for various joints of a CGR object in relation to a designated portion of the CGR object. For example, in some implementations, the motion controller 220 expresses joint movement values 230 for the boy action figure representation 108a (shown in FIG. 1) in relation to a head of the boy action figure representation 108a. Alternatively, in some implementations, the motion controller 220 states the joint movement values 220 in relation to a designated portion of the CGR environment. For example, in some implementations, the motion controller 220 expresses joint movement values 230 for the boy action figure representation 108a (shown in FIG. 1) in relation to a center or a corner of the CGR environment 106.

Figure 2B:
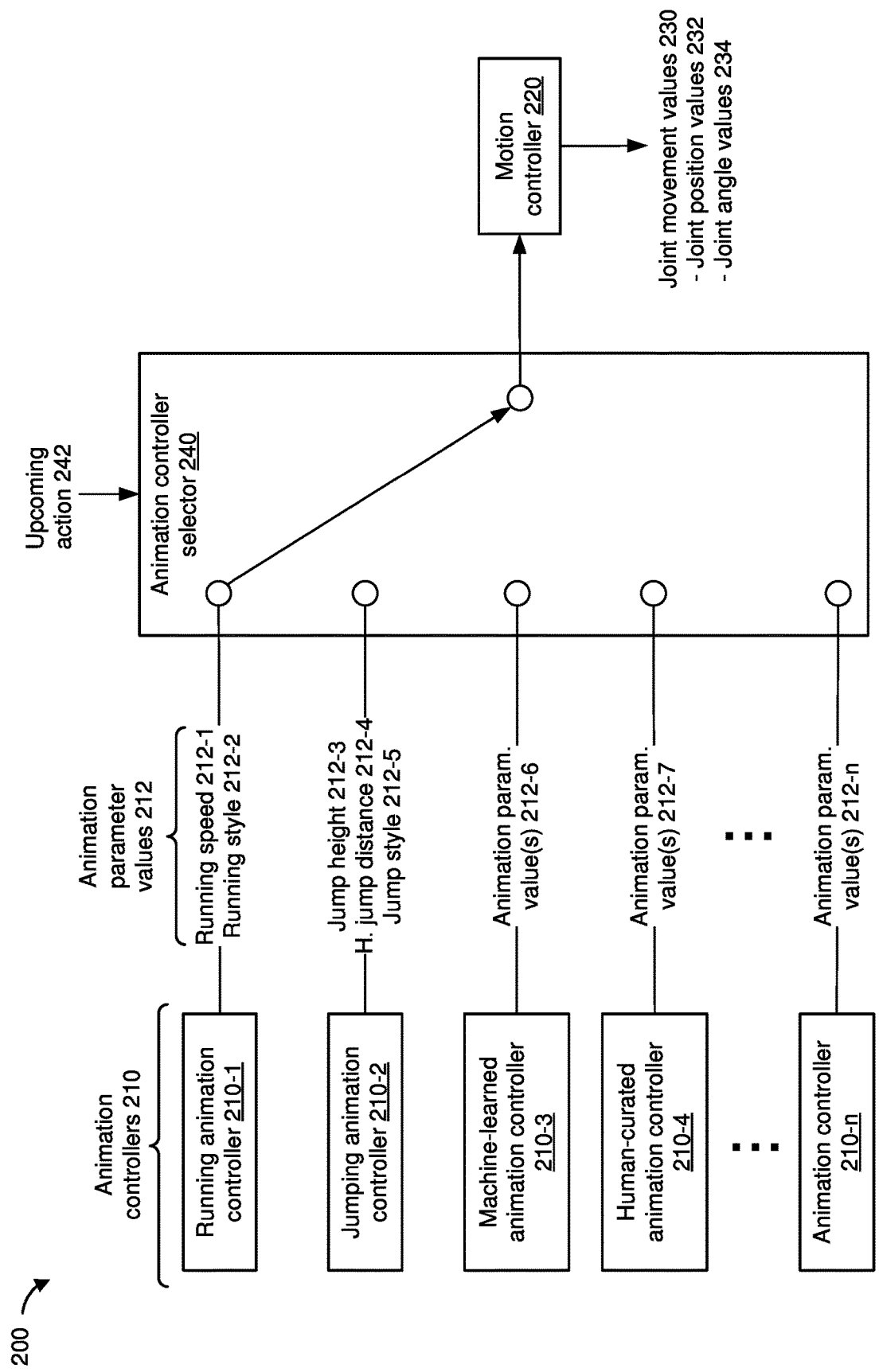
FIG. 2B is a block diagram of another system for controlling motion of a CGR object in accordance with some implementations.

Referring to FIG. 2B, in some implementations, the system 200 includes an animation controller selector 240. In some implementations, the animation controller selector 240 forwards an output of (e.g., the animation parameter values 212 determined by) one of the animation controllers 210 to the motion controller 220 based on an upcoming action 242. In some implementations, the animation controller selector 240 determines a type of animation that matches the upcoming action 242. For example, if the upcoming action 242 is for the boy action figure representation 108a to run away from the girl action figure representation 108b, the animation controller selector 240 determines that the running animation matches the upcoming action 242. As such, in this example, the animation controller selector 240 selects the running animation controller 210-1, and forwards the running speed 212-1 and the running style 212-2 to the motion controller 220. In some implementations, the animation controller selector 240 includes a multiplexer that selects the animation parameter values 212 from one of the animation controllers 210 and forwards the selected animation parameter values 212 to the motion controller 220.

Figure 3:
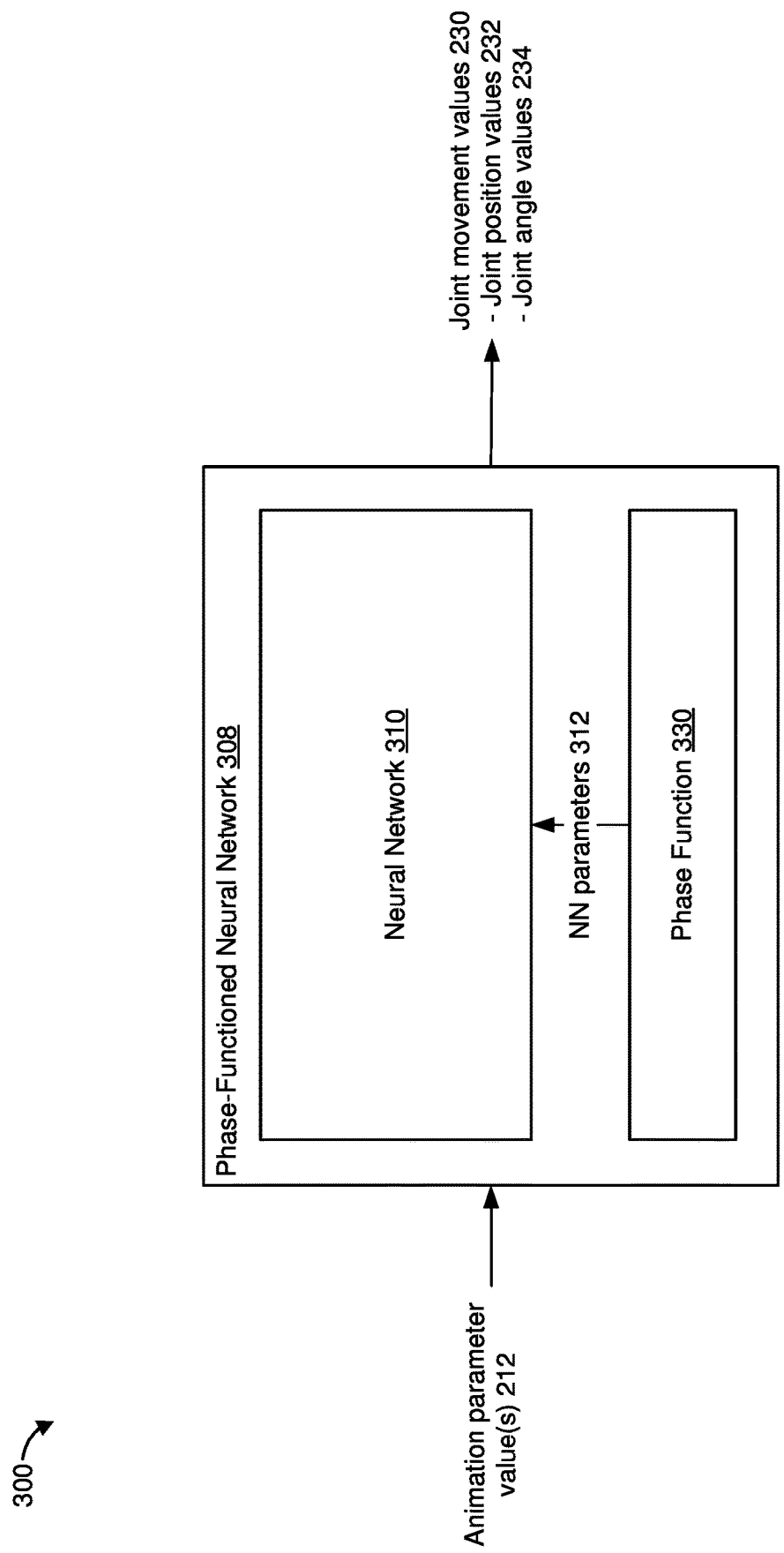
FIG. 3 is a block diagram of an example motion controller in accordance with some implementations.

FIG. 3 is a block diagram of an example motion controller 300 in accordance with some implementations. In some implementations, the motion controller 300 implements the motion controller 120 shown in FIG. 1 and/or the motion controller 220 shown in FIGS. 2A-2B. In various implementations, the motion controller 300 obtains (e.g., receives) one or more of the animation parameter values 212, and the motion controller 300 generates the joint movement values 230 based on the animation parameter value(s) 212.

In various implementations, the motion controller 300 includes a neural network system ("neural network", hereinafter for the sake of brevity). In the example of FIG. 3, the motion controller 300 includes a Phase-Functioned Neural Network (PFNN) 308. In some implementations, the PFNN 308 includes a neural network 310, and a phase function 330. In various implementations, the neural network 310 is associated with various neural network parameters 312 (e.g., neural network weights).

In some implementations, the phase function 330 determines the neural network parameters 312 for the neural network 310 based on a phase. As described herein, an animation includes a sequence of poses that collectively spans a time duration. In some implementations, the phase is a variable which represents a timing of a pose within the time duration associated with the animation. In various implementations, the phase is continuously changing because different times within the time duration of the animation are associated with different poses. Since the neural network parameters 312 are a function of the phase, the neural network parameters 312 change as the phase changes.

FIG. 4A is a flowchart representation of a method 400 of controlling motion of a CGR object in accordance with some implementations. In various implementations, the method 400 is performed by a device with a non-transitory memory and one or more processors coupled with the non-transitory memory (e.g., the controller 102 and/or the electronic device 103 shown in FIG. 1). In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 402, in various implementations, the method 400 includes determining, by a first animation controller, values for a first set of animation parameters associated with a first animation for a computer-generated reality (CGR) object. For example, as shown in FIGS. 2A-2B, in some implementations, the running animation controller 210-1 determines the running speed 212-1 and/or the running style 212-2 for a CGR object (e.g., for the boy action figure representation 108a shown in FIG. 1). In some implementations, the CGR object is associated with a plurality of joints. For example, as shown in FIG. 1, the boy action figure representation 108a includes various joints (e.g., a right shoulder joint, a left shoulder joint, a right elbow joint, a left elbow joint, a right wrist joint, a left wrist joint, a right hip joint, a left hip joint, a right knee joint, a left knee joint, a right ankle joint and a left ankle joint).

As represented by block 404, in various implementations, the method 400 includes generating, by a motion controller, respective joint movements for the plurality of joints based on the values for the first set of animation parameters. For example, as shown in FIGS. 2A-2B, in some implementations, the motion controller 220 generates the joint movement values 230 based on one or more of the animation parameter values 212. For example, as described herein, in some implementations, the motion controller 220 generates the joint movement values 230 based on the running speed 212-1 and/or the running style 212-2 provided by the running animation controller 210-1.

As represented by block 406, in various implementations, the method 400 includes manipulating the CGR object in accordance with the respective joint movements for the plurality of joints in order to provide an appearance that the CGR object is moving within a degree of similarity to (e.g., within a similarity threshold of, or in accordance with) the first animation. For example, in some implementations, the method 400 includes providing the joint movement values 230 (shown in FIGS. 2A-2B) to a rendering and display pipeline that manipulates (e.g., animates) the CGR object in accordance with the joint movement values 230. As an example, the method 400 includes providing the joint movement values 230 to a rendering and display pipeline that causes various joints of the boy action figure representation 108a (shown in FIG. 1) to move according to the joint movement values 230.

Figure 4B:
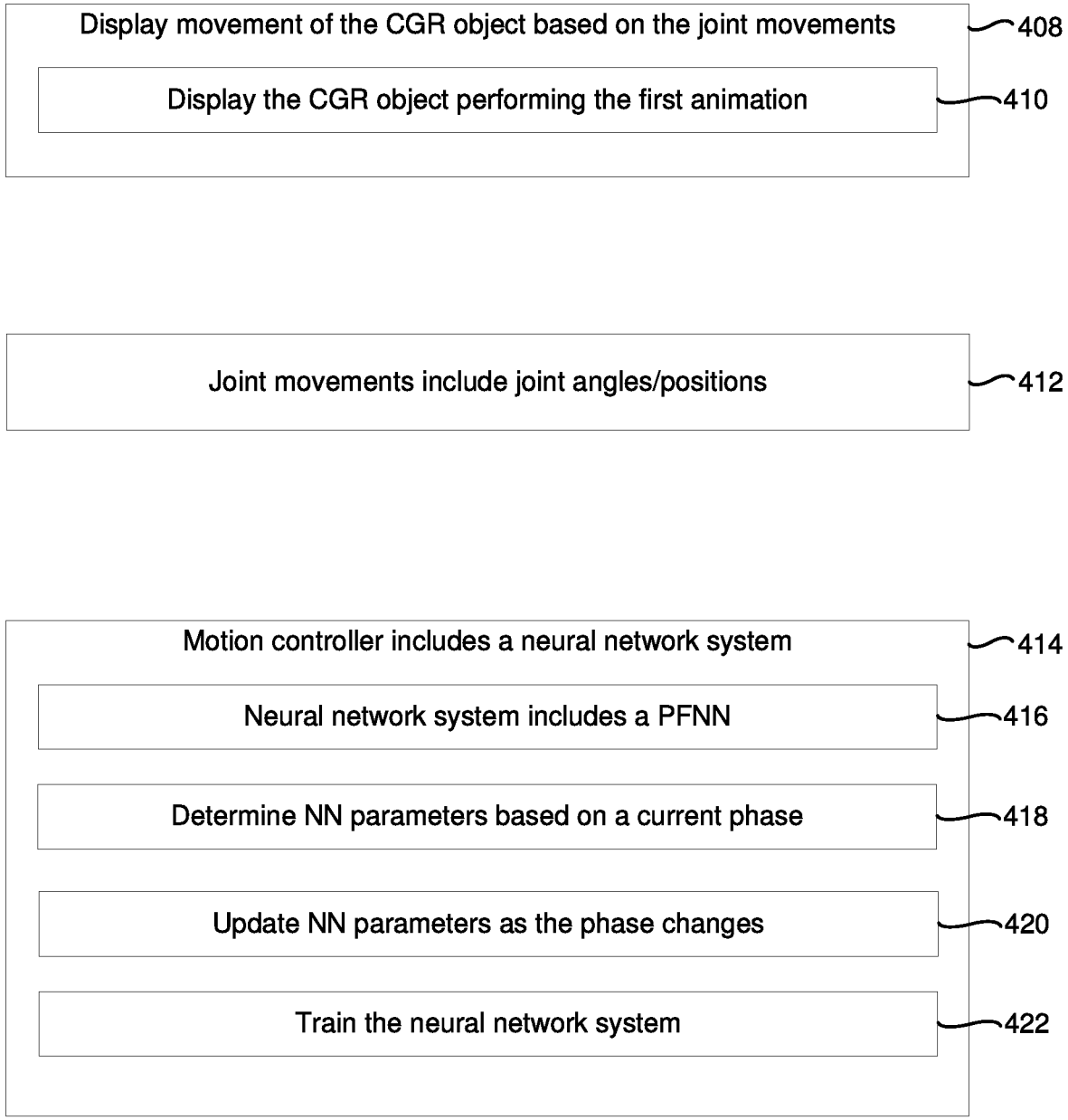

Referring to FIG. 4B, as represented by block 408, in some implementations, manipulating the CGR object includes displaying movement of the CGR object based on the joint movements. For example, in some implementations, the method 400 includes displaying movement of the boy action figure representation 108a, the girl action figure representation 108b, the robot representation 108c and/or the drone representation 108d shown in FIG. 1 based on the joint movements.

As represented by block 410, in some implementations, the method 400 includes displaying the CGR object performing the first animation. For example, if the first animation includes a running animation, the method 400 includes displaying the CGR object as performing a running motion that is within a degree of similarity to a sequence of poses defined by the running animation. Similarly, if the first animation includes a jumping animation, the method 400 includes displaying the CGR object as performing a jumping motion that is within a degree of similarity to a sequence of poses defined by the jumping animation.

As represented by block 412, in various implementations, the joint movements include respective joint angles for the plurality of joints. For example, as shown in FIGS. 2A-2B, in some implementations, the joint movement values 230 include joint angle values 234. As described herein, in some implementations, the joint angle values 234 include one or more sets of angular coordinates (e.g., $\alpha$, $\beta$ and $\gamma$) for respective joints.

As represented by block 412, in some implementations, the joint movements include respective joint positions for the plurality of joints. For example, as shown in FIGS. 2A-2B, in some implementations, the joint movement values 230 include joint position values 232. As described herein, in some implementations, the joint position values 232 include one or more sets of position coordinates (e.g., x, y, z) for respective joints.

As represented by block 414, in some implementations, the motion controller includes a neural network system. As represented by block 416, in some implementations, the neural network system includes a Phase-Functioned Neural Network (PFNN) (e.g., the PFNN 308 shown in FIG. 3). In some implementations, the PFNN includes a neural network that is associated with various neural network parameters (e.g., the neural network 310 and the neural network parameters 312 shown in FIG. 3), and a phase function that determines values for the neural network parameters (e.g., the phase function 330 shown in FIG. 3).

As represented by block 418, in some implementations, the method 400 includes determining a current phase of the first animation, and determining values for neural network parameters of the neural network system based on the current phase of the first animation. As described herein, in some implementations, the first animation includes a sequence of poses that collectively spans a time duration associated with the first animation. In some implementations, determining the current phase of the first animation includes determining a value that represents a timing of a current pose in relation to the time duration associated with the first animation.

As represented by block 420, in some implementations, the method 400 includes detecting a change in the current phase of the first animation, and determining new values for the neural network parameters of the neural network system based on the change in the current phase of the first animation. In some implementations, the phase of the first animation is continuously changing. As such, in some implementations, the method 400 includes continuously determining new values for the neural network parameters of the neural network.

As represented by block 422, in some implementations, the method 400 includes training the motion controller by providing the motion controller with training data that includes values for the first set of animation parameters and corresponding joint movements. For example, if the motion controller is being trained to generate joint movements for a running animation, then the method 400 includes providing the motion controller with training data that includes different running speeds and corresponding joint movements for each of the running speeds in the training data. Similarly, if the motion controller is being trained to generate joint movements for a jumping animation, the method 400 includes providing the motion controller with training data that includes different jump heights and corresponding joint movements for each of the jump heights in the training data.

Referring to FIG. 4C, as represented by block 424, in some implementations, the method 400 includes obtaining, from a second animation controller, a second set of animation parameters associated with a second animation (e.g., obtaining the jump height 212-3, the horizontal jump distance 212-4 and/or the jump style 212-5 shown in FIGS. 2A-2B). In some implementations, the method 400 includes generating joint movements based on the second set of animation parameters (e.g., generating the joint movement values 230 based on the jump height 212-3, the horizontal jump distance 212-4 and/or the jump style 212-5). In some implementations, the method 400 includes manipulating the CGR object in accordance with the second set of animation parameters in order to provide an appearance that the CGR object is moving within a degree of similarity to the second animation (e.g., manipulating the boy action figure representation 108*a* shown in FIG. 1 based on the joint movement values 230).

As represented by block 426, in some implementations, the method 400 includes training the motion controller by providing the motion controller with training data that includes values for the second set of animation parameters and corresponding joint movements. For example, if the motion controller is being trained to generate joint movements for a jumping animation, the method 400 includes providing the motion controller with training data that includes different jump heights, horizontal jump distances and/or jump styles, and corresponding joint movements.

As represented by block 428, in some implementations, the method 400 includes determining that the CGR object is to perform an action in a CGR environment. In some implementations, the method 400 includes determining that the action is within a degree of similarity to the first animation. In some implementations, the method 400 includes selecting the first animation controller from a plurality of animation controllers. For example, as shown in FIG. 2B, in some implementations, the animation controller selector 240 selects and forwards animation parameter values generated by a particular one of the animation controllers 210 based on the upcoming action 242.

As represented by block 430, in some implementations, the method 400 includes querying the first animation controller for the values for the first set of animation parameters. In some implementations, the method 400 includes receiving the values for the first set of animation parameters from the first animation controller. For example, in the example of FIG. 2B, the motion controller 220 may query the running animation controller 210-1 for the running speed 212-1 and/or the running style 212-2.

Figure 5:
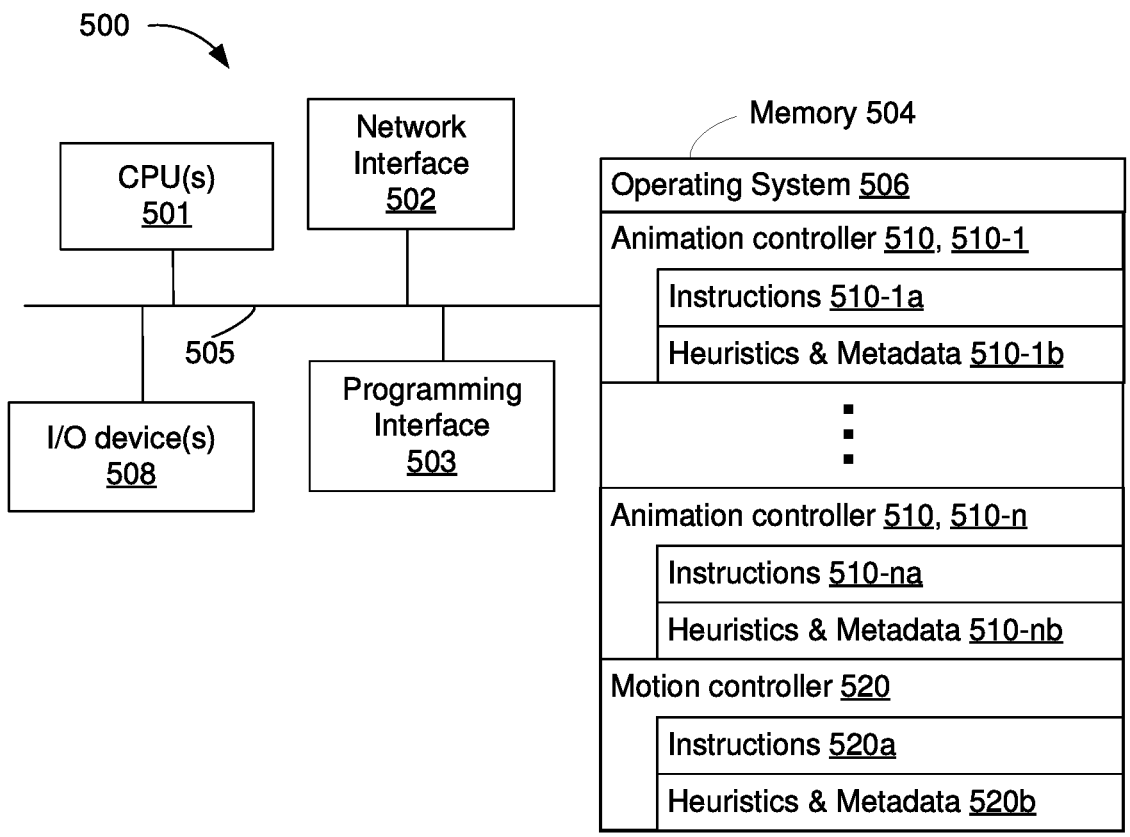
FIG. 5 is a block diagram of a device that controls motion of a CGR object in accordance with some implementations.

FIG. 5 is a block diagram of a device 500 enabled with one or more components for controlling motion of a CGR object in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 500 includes one or more processing units (CPUs) 501, a network interface 502, a programming interface 503, a memory 504, one or more input/output (I/O) devices 508, and one or more communication buses 505 for interconnecting these and various other components.

In some implementations, the network interface 502 is provided to, among other uses, establish and maintain a metadata tunnel between a cloud hosted network management system and at least one private network including one or more compliant devices. In some implementations, the one or more communication buses 505 include circuitry that interconnects and controls communications between system components. The memory 504 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 504 optionally includes one or more storage devices remotely located from the one or more CPUs 501. The memory 504 comprises a non-transitory computer readable storage medium.

In some implementations, the memory 504 or the non-transitory computer readable storage medium of the memory 504 stores the following programs, modules and data structures, or a subset thereof including an optional operating system 506, animation controllers 510 (e.g., a first animation controller 510-1, . . . , and an nth animation controller 510-*n*), and a motion controller 520. In various implementations, the device 500 performs the method 400 shown in FIGS. 4A-4C.

In some implementations, the animation controllers 510 determine respective animation parameter values (e.g., the animation parameter values 212 shown in FIGS. 2A-2B). In some implementations, the animation controllers 510 operate in substantially the same manner as the animation controllers 110-1, 110-2, . . . , and 110-*n* shown in FIG. 1 and/or the animation controllers 210 shown in FIGS. 2A-2B. To that end, in some implementations, each of the animation controllers 510 includes respective instructions, and respective heuristics and metadata (e.g., the first animation controller 510-1 includes a first set of instructions 510-1*a* and a first set of heuristics and metadata 510-1*b*, . . . , and the nth animation controller 510-*n* includes an nth set of instructions 510-*na* and an nth set of heuristics and metadata 510-*nb*.

In some implementations, the motion controller 520 determines joint movements (e.g., the joint movement values 230 shown in FIGS. 2A-2B) based on the animation parameter values provided by the animation controllers 510. In some implementations, the motion controller 520 operates in substantially the same manner as the motion controller 120 shown in FIG. 1 and/or the motion controller 220 shown in FIGS. 2A-2B. To that end, the motion controller 520 includes instructions 520*a*, and heuristics and metadata 520*b*.

In some implementations, the one or more I/O devices 508 includes a display (e.g., an opaque display or an optical see-through display). In some implementations, the one or more I/O devices 508 include a sensor (e.g., an environmental sensor, for example, an image sensor, a depth sensor, an audio sensor, etc.).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at a device including a non-transitory memory and one or more processors coupled with the non-transitory memory:
    receiving, based on a user input, specific actions that a virtual agent is permitted to perform;
        determining, based at least in part on the specific actions, an upcoming action to be exhibited by a computer-generated reality (CGR) object within a time duration, wherein the CGR object represents the virtual agent and the CGR object includes a plurality of joints;
        determining that the upcoming action matches a first animation of a plurality of animations, wherein the first animation includes a sequence of poses that spans the time duration;
        in response to the upcoming action matching the first animation of the plurality of animations:
            selecting, from a plurality of animation controllers, a first animation controller that is associated with the first animation; and
            determining, by the first animation controller, values for a first set of animation parameters associated with the first animation;
        generating, by a motion controller, respective joint movements for the plurality of joints based on the values for the first set of animation parameters; and
        manipulating the CGR object in accordance with the respective joint movements for the plurality of joints in order to provide an appearance that the CGR object is moving within a degree of similarity to the first animation.

2. The method of claim 1, wherein manipulating the CGR object includes displaying movement of the CGR object based on the joint movements.

3. The method of claim 1, further comprising:
    displaying the CGR object performing the first animation.

4. The method of claim 1, wherein the joint movements include respective joint angles for the plurality of joints.

5. The method of claim 1, wherein the joint movements include respective joint positions for the plurality of joints.

6. The method of claim 1, wherein the motion controller includes a neural network system.

7. The method of claim 6, wherein the neural network system include a Phase-Functioned Neural Network (PFNN).

8. The method of claim 7, further comprising:
    determining a current phase of the first animation; and
    determining values for neural network parameters of the neural network system based on the current phase of the first animation.

9. The method of claim 8, wherein the first animation includes a sequence of poses that collectively span a time duration associated with the first animation, and wherein determining the current phase of the first animation comprises:
    determining a value that represents a timing of a current pose in relation to the time duration associated with the first animation.

10. The method of claim 8, further comprising:
    detecting a change in the current phase of the first animation; and
    determining new values for the neural network parameters of the neural network system based on the change in the current phase of the first animation.

11. The method of claim 1, further comprising:
    training the motion controller by providing the motion controller with training data that includes values for the first set of animation parameters and corresponding joint movements.

12. The method of claim 1, further comprising:
    obtaining, from a second animation controller of the plurality of animation controllers, a second set of animation parameters associated with a second animation;
    generating joint movements based on the second set of animation parameters; and
    manipulating the CGR object in accordance with the second set of animation parameters in order to provide an appearance that the CGR object is moving within a degree of similarity to the second animation.

13. The method of claim 12, further comprising:
    training the motion controller by providing the motion controller with training data that includes values for the second set of animation parameters and corresponding joint movements.

14. The method of claim 1, wherein determining the values for the first set of animation parameters comprises:
    querying the first animation controller for the values for the first set of animation parameters; and
    receiving the values for the first set of animation parameters from the first animation controller.

15. A device comprising:
one or more processors;
a non-transitory memory;
one or more displays; and
one or more programs stored in the non-transitory memory, which, when executed by the one or more processors, cause the device to:
  obtain an indication of an upcoming action to be exhibited by a computer-generated reality (CGR) object that includes a plurality of joints;
  in response to the upcoming action matching a first animation of a plurality of animations:
    select, from a plurality of animation controllers, a first animation controller that is associated with the first animation; and
    determine, via the first animation controller, values for a first set of animation parameters associated with the first animation;
  generate, by a Phase-Functioned Neural Network (PFNN), respective joint movements for the plurality of joints based on the values for the first set of animation parameters, wherein values for parameters of the PFNN are based on a current phase of the first animation; and
  manipulate the CGR object in accordance with the respective joint movements for the plurality of joints in order to provide an appearance that the CGR object is moving within a degree of similarity to the first animation.

16. The device of claim 15, wherein the device manipulates the CGR object by displaying movement of the CGR object based on the joint movements.

17. The device of claim 15, wherein the one or more programs cause the device to:
display the CGR object performing the first animation.

18. The device of claim 15, wherein the joint movements include respective joint angles for the plurality of joints.

19. A non-transitory memory storing one or more programs, which, when executed by one or more processors of a device with a display, cause the device to:
  obtain an indication of an upcoming action to be exhibited by a computer-generated reality (CGR) object that includes a plurality of joints;
  in response to the upcoming action matching a first animation of a plurality of animations:
    selecting, from a plurality of animation controllers, a first animation controller that is associated with the first animation; and
    determine, via the first animation controller, values for a first set of animation parameters associated with the first animation;
  generate, by a Phase-Functioned Neural Network (PFNN), respective joint movements for the plurality of joints based on the values for the first set of animation parameters, wherein values for parameters of the PFNN are based on a current phase of the first animation; and
  manipulate the CGR object in accordance with the respective joint movements for the plurality of joints in order to provide an appearance that the CGR object is moving within a degree of similarity to the first animation.

* * * * *